United States Patent [19]

Summo

[11] 4,265,842
[45] May 5, 1981

[54] METHOD OF FORMING A CORNER IN A THERMOPLASTIC MATERIAL USING ULTRASONIC VIBRATIONS

[75] Inventor: Arthur M. Summo, Londonderry, N.H.

[73] Assignee: Branson Ultrasonics Corporation, New Canaan, Conn.

[21] Appl. No.: 115,908

[22] Filed: Jan. 28, 1980

[51] Int. Cl.³ ............................................. B06B 3/00
[52] U.S. Cl. ..................................... 264/23; 264/126
[58] Field of Search ................................ 264/23, 126

[56] References Cited

U.S. PATENT DOCUMENTS

| | | | |
|---|---|---|---|
| 3,392,219 | 7/1968 | Smith et al. | 264/23 |
| 4,032,382 | 6/1977 | Obeda | 264/23 |
| 4,087,297 | 5/1978 | Johnson | 264/23 |

*Primary Examiner*—Donald E. Czaja
*Assistant Examiner*—James R. Hall
*Attorney, Agent, or Firm*—Ervin B. Steinberg; Philip J. Feig

[57] ABSTRACT

A corner is formed in corrugated thermoplastic material or board using ultrasonic vibrations by disposing the corrugated material between an anvil and a half wavelength resonator having a portion of its frontal surface shaped for producing a crease. Contact is provided between the shaped portion of the resonator frontal surface and the material so as to crush the material. The resonator is rendered resonant for causing the material in contact with the resonator frontal surface to soften and flow. After a sufficient period of time, usually a fraction of a second, the frontal surface is withdrawn from contact with the material. When the softened and flowing material solidifies a crease is manifest in the material which then is folded to form a corner.

2 Claims, 6 Drawing Figures

METHOD OF FORMING A CORNER IN A THERMOPLASTIC MATERIAL USING ULTRASONIC VIBRATIONS

SUMMARY OF THE INVENTION

This invention relates to a method of forming corners in corrugated thermoplastic material or board using ultrasonic vibrations. Corrugated thermoplastic board comprising a pair of flat plastic covers having corrugated plastic liner material disposed between the respective covers is disposed on an anvil. A half wavelength resonator having a frontal surface shaped for producing a crease, blade shaped for example, is provided and disposed opposite the material. The frontal surface of the resonator is then urged into contact with the corrugated thermoplastic so as to crush the material to substantially one and one-half times the thickness of one cover of the material. With the thermoplastic in this crushed condition, ultrasonic vibrations are applied to cause a softening, melting and then a flowing of the thermoplastic material in contact with the resonator frontal surface. Upon cessation of the ultrasonic vibrations and withdrawal of the resonator frontal surface from contact with the material, the material solidifies. A weld in the form of a flexible crease is then manifest in the corrugated material which is then folded to thereby form a corner.

In prior attempts to make corners or containers out of corrugated thermoplastic material in the absence of folding a previously caused weld, the material would tend to straighten out and, therefore, deform and distort the shape of the container. The present method provides an inexpensive and simple technique for forming a corner in corrugated thermoplastic board.

The use of ultrasonic vibrations for welding thermoplastic material is well known. However, the use of ultrasonic vibrations for forming a corner in substantially rigid flat packaging material such as corrugated thermoplastic board is novel and has not been described in the prior art.

The apparatus for applying ultrasonic vibrations is by means of a conventional ultrasonic welder such as a Model 800 ultrasonic welder manufactured by Branson Sonic Power Company, Danbury, Conn. which provides high frequency vibratory energy at a frequency of approximately 20 KHz.

The principal object of the invention is therefore the provision of a method of forming a corner in substantially flat packaging material, such as corrugated thermoplastic board, using ultrasonic vibrations.

Further objects of this invention will become more readily apparent when the specification is read in conjunction with the the accompanying drawings.

DETAILED DESCRIPTION OF THE INVENTION

Figure 1:
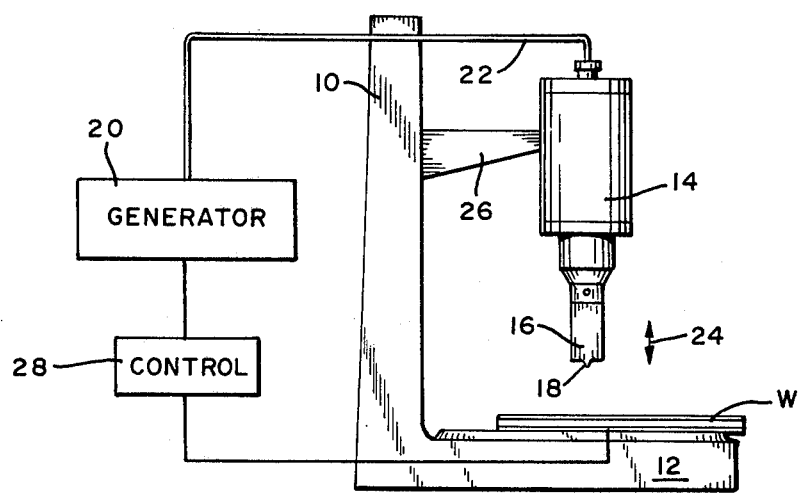
FIG. 1 is an elevational schematic diagram of an apparatus for practicing the invention.

Referring to the figures and FIG. 1 in particular a typical apparatus for practicing the present invention is shown. An ultrasonic welding stand comprises an upright 10 and a base 12 for supporting an electroacoustic converter 14 and a resonator 16. The converter 14 converts the applied electrical energy having a frequency typically between one KHz and 100 KHz into high frequency mechanical vibratory motion (vibrations). A typical converter 14 for use in the present invention is described in U.S. Pat. No. 3,524,085 issued Aug. 11, 1970 to A. Shoh entitled "Sonic Transducer".

Coupled to the converter 14 at an antinodal region of longitudinal motion is a half wavelength resonator 16 having a portion of its frontal surface shaped in the form of a blade 18. The converter 14 and the resonator 16 are each dimensioned to be resonant at the frequency of the electrical energy provided by an electrical generator 20 via conductor 22 to the converter 14. A typical operating frequency is 20 KHz.

When the converter is energized at the pedetermined frequency, the frontal surface 18 of the resonator 16 undergoes high frequency vibratory motion along the longitudinal direction of the resonator as indicated by the arrow 24.

The converter and resonator assembly are coupled to the upright 10 by means of a brace 26. Drive means (not shown) acting upon the brace 26 which supports the converter for reciprocating motion along the upright 10, causes the converter 14 and resonator 16 to undergo vertical motion toward and away from the base 12 responsive to a signal from control means 28. Control means 28 provides control signals to actuate the generator 20 and the drive means for providing forced contact between the blade 18 of resonator 16 and one cover 32 of the corrugated thermoplastic material W and for rendering the resonator resonant and thereby providing ultrasonic vibrations to the material.

Figure 2A:
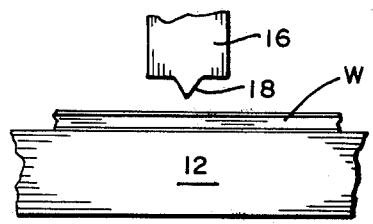
FIGS. 2A, 2B and 2C are partial plan views of a portion of the apparatus and corrugated thermoplastic material while practicing the invention.
Figure 2B:
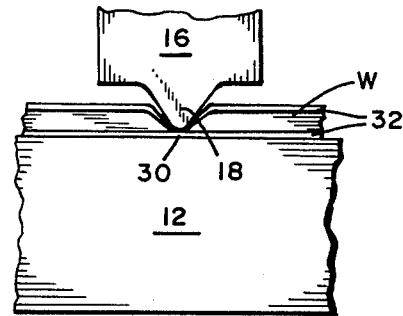
Figure 2C:
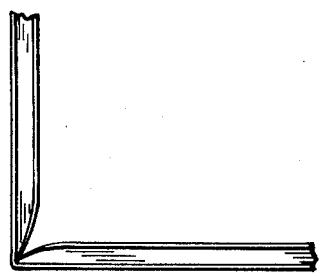
Figure 3:
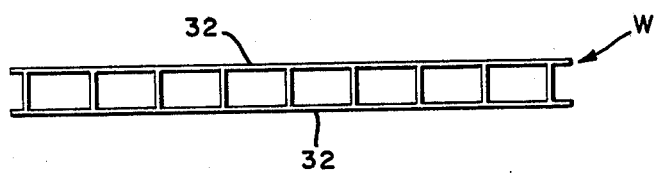
FIG. 3 is a cross-sectional view of the corrugated thermoplastic board.
Figure 4:
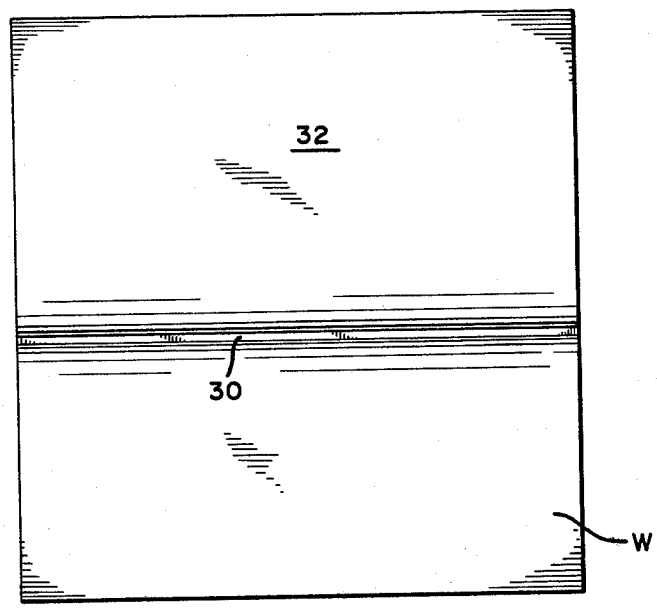
FIG. 4 is a plan view of the board.

Having described in some detail the known apparatus for practicing the invention, the method of forming a corner in corrugated thermoplastic board using ultrasonic vibrations is more clearly illustrated in FIGS. 2A, 2B and 2C. In FIG. 2A the corrugated thermoplastic board is disposed on the base 12 directly opposite the frontal surface of the resonator 16. In FIG. 2B the resonator 16 and specifically the blade 18 is urged into intimate contact with the corrugated thermoplastic material by virtue of a signal from control means 28 causing the brace 26 to lower converter 14 and resonator 16 into forced contact with one cover 32 of the material W. The blade 18 is further urged toward the opposite cover 32 of the material thereby crushing the material to a thickness of substantially one and one-half times the thickness of one cover of the corrugated material. With the corrugated material in this crushed condition, control means 28 provides a signal to generator 20 for energizing the converter 14. The converter 14 upon receipt of the electrical energy signal converts the electrical signal to high frequency vibratory motion which is manifest at the resonator frontal surface and, therefore, at blade 18. The vibrations of blade 18 causes a localized heating, softening, melting and then flowing of the crushed corrugated thermoplastic material in the region 30 under the resonator frontal surface as shown in FIGS. 2B and 4. After a time sufficient to weld the corrugated material along the region 30, usually a fraction of a second, the resonator 16 is retracted upwardly, away from the corrugated material and upon solidification of the thermoplastic material a permanent, flexible weld in the form of a crease results. The material is then folded in the crease to thereby form a corner as shown in FIG. 2C. FIG. 3 shows the corrugated plastic liner material disposed between and bonded to the covers 32. FIG. 4 illustrates the corrugated board welded along the region 30. It will be noted that by causing additional creases in a sheet of corrugated thermoplastic material a box structure or a zig-zag structure can be formed which is most beneficial in packaging goods.

In actual practice it has been found that the method is particularly useful in cross grain (corrugated pattern) deadening and close proximity multifold applications. Good results are achieved when the weld time is 0.3 seconds, hold time is 0.5 seconds, the pressure is 60 psig and the trigger pressure at which the ultrasonic energy commences is 35 psig. It will be apparent that the resonator can be rendered resonant before, during or after compressing of the corrugated thermoplastic material.

While a preferred method of forming a corner in thermoplastic corrugated materal using ultrasonic energy has been described and illustrated it will be apparent to those skilled in the art that further modifications may be made without deviating from the broad principle of the invention which shall be limited only by the scope of the appended claims.

What is claimed is:

1. The method of forming a corner in a substantially rigid flat packaging material such as a corrugated thermoplastic board comprising a pair of flat plastic covers having corrugated plastic liner material disposed between and bonded to said respective covers, the steps including:

providing a resonator adapted to the resonant and vibrate at an ultrasonic frequency and having a frontal surface shaped for producing a crease in said board;

providing contact between said frontal surface and one of said covers and urging said frontal surface toward the opposite cover against the rigidity exhibited by the corrugations of said liner material to crush said corrugations;

rendering said resonator resonant whereby under the influence of said ultrasonic vibrations and the force between said frontal surface and said board the thermoplastic material contacted by said frontal surface softens and flows;

withdrawing said frontal surface from contact with said board before it has penetrated through said opposite cover whereby to cause responsive to the solidification of the softened thermoplastic material a weld between said covers in the form of a crease, and folding the board in the crease to thereby form a corner.

2. The method as set forth in claim 1, and urging said frontal surface toward the opposite cover until the board is substantially one and one-half times the thickness of said one cover.

* * * * *